United States Patent
Wang et al.

(10) Patent No.: US 9,637,412 B2
(45) Date of Patent: May 2, 2017

(54) LOW-TEMPERATURE FAST-FIRED LIGHTWEIGHT CERAMIC HEAT INSULATION PLATE AND PREPARATION METHOD THEREOF

(71) Applicant: MONALISA GROUP CO., LTD., Foshan, Guangdong (CN)

(72) Inventors: Qinggang Wang, Foshan (CN); Yijun Liu, Foshan (CN); Limin Pan, Foshan (CN); Bingyu Pan, Foshan (CN); Yong Zhao, Foshan (CN)

(73) Assignee: MONALISA GROUP CO., LTD., Foshan, Guangdong (CN)

( * ) Notice: Subject to any disclaimer, the term of this patent is extended or adjusted under 35 U.S.C. 154(b) by 34 days.

(21) Appl. No.: 14/783,753

(22) PCT Filed: Apr. 28, 2013

(86) PCT No.: PCT/CN2013/074926
§ 371 (c)(1),
(2) Date: Oct. 9, 2015

(87) PCT Pub. No.: WO2014/166132
PCT Pub. Date: Oct. 16, 2014

(65) Prior Publication Data
US 2016/0083296 A1     Mar. 24, 2016

(30) Foreign Application Priority Data

Apr. 11, 2013    (CN) .......................... 2013 1 0123877

(51) Int. Cl.
| | | |
|---|---|---|
| *C04B 33/132* | (2006.01) | |
| *C04B 38/06* | (2006.01) | |
| *C04B 33/02* | (2006.01) | |
| *C04B 33/13* | (2006.01) | |
| *C04B 33/20* | (2006.01) | |

(52) U.S. Cl.
CPC .......... *C04B 33/132* (2013.01); *C04B 33/025* (2013.01); *C04B 33/13* (2013.01); *C04B 33/1305* (2013.01); *C04B 33/20* (2013.01); *C04B 38/064* (2013.01); *C04B 2235/36* (2013.01); *C04B 2235/5427* (2013.01); *C04B 2235/6562* (2013.01); *C04B 2235/6567* (2013.01); *C04B 2235/9607* (2013.01)

(58) Field of Classification Search
CPC .............. C04B 33/132; C04B 33/1324; C04B 33/1305; C04B 38/064
See application file for complete search history.

(56) References Cited

U.S. PATENT DOCUMENTS

| | | | |
|---|---|---|---|
| 6,221,289 B1 * | 4/2001 | Corbett ................... | C04B 35/14 264/328.2 |
| 6,340,650 B1 | 1/2002 | Haun | |
| 9,506,244 B2 * | 11/2016 | Goletto ..................... | E04B 1/78 |
| 2007/0110989 A1 * | 5/2007 | Shin ....................... | C04B 33/04 428/312.2 |
| 2009/0308001 A1 * | 12/2009 | Wu ......................... | E04B 1/762 52/173.3 |

FOREIGN PATENT DOCUMENTS

| | | | | |
|---|---|---|---|---|
| CN | 101186519 A | 5/2008 | | |
| CN | 101565312 A | 10/2009 | | |
| CN | 102101792 A | 6/2011 | | |
| CN | 102399090 A | 4/2012 | | |
| CN | 102643111 A | 8/2012 | | |
| CN | 102887721 A | 1/2013 | | |
| IT | EP 2143695 A1 * | 1/2010 | ............. | C04B 33/04 |

OTHER PUBLICATIONS

CN 101186519 (Shui) May 28, 2008 (English language machine translation). [online] [retrieved Jan. 3, 2017]. Retrieved from: Espacenet.*
ISA State Intellectual Property Office of the People's Republic of China, International Search Report Issued in Application No. PCT/CN2013/074926, Jan. 16, 2014, WIPO, 4 pages.

* cited by examiner

*Primary Examiner* — Erin Snelting
(74) *Attorney, Agent, or Firm* — Alleman Hall McCoy Russell & Tuttle LLP

(57) ABSTRACT

A low-temperature fast-fired lightweight ceramic heat insulation plate and a preparation method thereof. The preparation method comprises: performing ball milling and powder spraying on a raw material containing foamable ceramic waste slag to prepare foamable powder, the foamable ceramic waste slag accounting for 80-100 wt % of the weight of the raw material; uniformly mixing 100 weight portions of the foamable powder with 3-15 weight portions of granular powder of a low-melting-point organic matter to obtain mixed powder materials; pressing the mixed powder materials under 10-20 MPa to prepare a ceramic green body; and firing the ceramic green body at a temperature of 1100-1170° C. to prepare the lightweight energy-saving ceramic heat insulation plate.

6 Claims, No Drawings

LOW-TEMPERATURE FAST-FIRED LIGHTWEIGHT CERAMIC HEAT INSULATION PLATE AND PREPARATION METHOD THEREOF

TECHNICAL FIELD

The present invention involves the field of inorganic material technology, and specifically relates to a method for preparing low-temperature fast-fired lightweight ceramic heat insulation plates, particularly to a preparation method for obtaining low bulk density ceramic heat insulation plates utilizing a loose-pressure method and foamable ceramic waste.

BACKGROUND

In the past few years, wall heat insulation materials have had significant developments which can conserve materials, while improving the heat insulation properties of the walls, saving energy, and decreasing environmental pollution. Lightweight ceramic heat insulation plates are a type of special ceramic heat insulation plate with low firing temperatures, having large amounts of uniform pores and bulk densities ranging from 0.6-1.0 g/cm$^3$. Besides the benefit of maintaining the durability and fire-proofing properties of traditional ceramics, lightweight ceramic heat insulation plates also have the superior characteristics of being light, heat-insulating, and sound-insulating.

At present, the primary methods for making foamed ceramics (porous ceramics) are a powder green body foaming method and a slurry foaming method, which usually utilize foaming agents and large amounts of raw mineral materials. Because these techniques are complicated, the firing temperatures are high, the costs are relatively high, and it is not easy to continuously make foamed ceramics (porous ceramics) of a large size, thus limiting the applications thereof.

Furthermore, in the past few years, the ceramic industry has been growing greatly, and ceramic waste has been generated in larger and larger quantities, the disposal of which utilizes land and increases the powder quantity in the local air. The landfills utilize considerable manpower and material resources and pollute underground water. The generated ceramic waste not only exerts a huge pressure on the environments of cities, but also limits the economic development of the cities and limits the long-term development of the ceramic industry. Turning the waste into an asset is a focus of concern of both ceramic production companies and the whole of society. Therefore, investigating low-cost lightweight ceramic heat insulation plates utilizing ceramic waste has a significant impact on the improvement of the comprehensive energy efficiency of construction, the comprehensive utilization rate of mineral resources, and the long-term development of the ceramic industry.

CN101186519B discloses a method for making porous ceramic materials, utilizing ceramic waste and polished tile waste as raw materials, adding clay, high temperature sand, and low temperature sand, adding water for wet ball milling, pressurizing into green body ceramic tiles at 8 MPa after drying, and heating at 1140° C. for 100 minutes in a ceramic roller kiln to thereby obtain the porous ceramic materials. This method cannot solve the ventilation problem of dry pressing and fast firing (for example, firing periods are within 60 minutes).

CN102399090A discloses a lightweight glassy foamed ceramic, which mainly utilizes a ceramic wall, ground materials of floor tiles, and porcelain clay as raw materials. CN1028877211A discloses a foamed ceramic heat insulation plate which utilizes the polished waste of ceramic tiles, waste glass powders, waste frit powders, talcum, and red clay as raw materials. Similarly, this method cannot solve the ventilation problem of dry pressing and fast firing.

In summary, it is necessary to add clay as a component of the present formulas for making pressure-shaped and low bulk density ceramic heat insulation tiles. Because the ventilation problem of dry pressing and fast firing cannot be solved, in actual formulas the amount of foamable waste usually cannot be over 50%. If the foamable waste amount is over 80%, one has to carry out heap roasting using backing plates, the productivity is low, and the backing plates with high cost are consumed in large amounts.

In fact almost all the ceramic waste consists of residual ceramic clinker which was fired above 1200° C., which has been porcelainized, with a dense and uniform texture. As long as the problem of black cores and bulging due to the poor ventilation caused by the oxygenolysis of impurities such as organics in the polishing procedures can be solved, the low-temperature and fast firing in a roller kiln can be achieved.

SUMMARY OF INVENTION

In light of the problem of the prior art, the present invention provides a simple and effective preparation method of low bulk density lightweight ceramic heat insulation plates that can be produced by ordinary pressing machines and roller kilns. Specifically, in this invention, as components of the formulas, a large quantity of foamable ceramic waste is mixed with granular powders of organics as adhesives and pore-forming agents, under the condition of ensuring the strength of a green body. The resulting mixture is pressed by a low pressing force loose-pressure method, i.e. using a pressing force that is ⅓-⅔ of the ordinary pressing force so as to increase the pores of the powder, and finally fired in an ordinary roller kiln. This procedure ensures that the large amount of gas produced by the decomposition of organics during the process of mid- and low temperature firing of the heat insulation plates can be removed in time, and a porous structure can be formed during the high temperature period.

Firstly, the present invention provides a preparation method for low-temperature fast-fired lightweight ceramic heat insulation plates, comprising: performing ball milling and powder spraying on raw materials containing foamable ceramic waste to make foamable powders, the weight percentage of the foamable ceramic waste in the raw materials being 80-100 wt %; uniformly mixing 100 weight parts of the foamable powders with 3-15 weight parts of granular powders of low melting point organics; pressing the mixed powders under 10-20 MPa to make a ceramic green body; and firing the ceramic green body at 1100-1170° C. to make the lightweight energy-saving ceramic heat insulation plates.

In the formulas of this invention, the percentages of foamable ceramic waste are 80-100% while clay is not included, thus minimizing the problems of the necessity of oxidation and poor ventilation during the firing. This invention also utilizes organics with low melting points, which act as shaping additives for lubricating functions, being advantageous for the shaping of a raw brick; function as adhesives, which means, when the formed raw brick is dried at 130° C., the organics with low melting points melt into a liquid state, permeate and wrap around the powders, solidify again when cooling, form three dimensional networks, bond the powders into an ensemble, and improve the dry strength of the raw brick; and function as pore-generating agents so that the pores left after the organics are burned away decrease the bulk density of the products. As a result of using a low pressing force of 10-20 MPa (½-⅔ of the pressing force used for the ceramic products with the same specifications) for compression molding, in one aspect, because the foamable ceramic waste have many impurities, low-temperature fast firing needs quick ventilation, and the low pressures cause the raw brick to have a lower density and result in a higher inter-particle porosity, allowing the gas to have a ventilation path; in another aspect, the loose pressures decrease the bulk density, and decrease the partial deformation of the products due to the fast and intense swelling of the raw brick during the high temperature period.

Preferably, the low melting point organics may include polyethylene wax, polypropylene wax, and mineral wax. The low melting point organics have low melting points, can smoothly melt into a liquid state during the drying of raw brick, permeate and wrap around the surface of the powders, solidify again when cooling, form three dimensional networks, and bond the powders into an ensemble.

Preferably, the foamable ceramic waste includes ceramic polishing waste and ground ceramic materials. This invention uses ceramic polishing waste materials and/or ground ceramic materials as the primary raw materials, and not only significantly decreases the cost of raw materials for making the products, but also turns the waste into good resources, achieves the recycling of ceramic waste materials, and decreases the environmental pollution caused by ceramic waste.

Preferably, the raw materials may further include 0-20 wt % of sintering aids. The sintering aids may include waste glass powder, waste frit powders, and/or talcum. Adding sintering aids such as waste glass powders, waste frit powders, and/or talcum into the formulas can decrease the sintering temperature of the products, save energy, and reduce consumption.

The raw materials may further include 0-0.8 wt % of a foaming agent. This invention uses the foamable ceramic waste as the raw materials, and is effective without adding a foaming agent, but a foaming agent may be added to aid the foaming.

Preferably, the procedure parameters for firing are: the ceramic green body is heated to a temperature ranging from 1100-1170° C. within 20-35 minutes, and kept at the temperature for 5-10 minutes. The firing procedure of this invention is easy and controllable, and high quality lightweight energy-saving ceramic heat insulation plates can be made by one firing process.

Preferably, the weight percentages of the foamable ceramic waste in the raw materials are 90-100 wt %.

In another aspect, this invention also provides lightweight ceramic heat insulation plates prepared by the mentioned method, with the bulk density of the lightweight ceramic heat insulation plates being 0.6-1.0 g/cm$^3$. Preferably, the thermal conductivity of the lightweight energy saving ceramic heat insulation plates may be 0.15-1.25 W/m·K.

The lightweight ceramic heat insulation plates of this invention can decrease the cost of raw materials, conserve resources, have the characteristics of being environmentally friendly, large in dimension, fire-proof, sound-absorbent, thermally-insulative, moisture-proof, impermeable, frost-resistant, and flame-retardant, are a type of high quality lightweight ceramic heat insulation plate, and can be used as thermal-insulating materials for walls adhering to modern construction energy-saving standards and as thermally-insulative and heat-retentive materials in other areas.

DETAILED DESCRIPTION OF THE EMBODIMENTS

The present invention will be further described with reference to the embodiments mentioned below. It should be understood that the following embodiments are only used for explaining this invention, and do not limit this invention.

This invention provides a simple and effective method of preparing low bulk density lightweight energy-saving ceramic heat insulation plates produced by an ordinary pressing machine and roller kiln using ceramic waste as raw materials. The technical solution is as follows: using a large quantity of foamable waste as a component of the formulas, and adopting a low pressing force loose-pressure method to increase the inter-particle porosity under the condition of ensuring the strength of the green body, ensuring that the large quantity of gas produced from the decomposition of organics during the mid- and low temperature firing of the heat insulation plates can be vented in time, and wherein the heat insulation plates can form porous structures during the high temperature period.

The detailed procedures of the invention are:

First, as a component of the formulas, 80-100 wt % of foamable ceramic waste is made into foamable powder by procedures including ball milling, powder-spraying, etc. Foamable ceramic waste is a foamable waste material produced during the production of ceramic materials. For example, ceramic polishing waste materials include high temperature decomposed foamable compounds, ground ceramic materials produced during the process of ceramic slicing and edging, and other waste materials produced in the manufacture of ceramics. Ceramic polishing waste materials include waste materials produced by treatments of a mixture of waste water and waste residue produced by ceramics surface polishing, the treatments comprising precipitation as well as pressing filtration and aging. Ground ceramic materials include waste materials produced during the process of ceramics slicing and edging, while crushing and drying can be performed preliminarily depending on the dimension and water content thereof. The use of ground materials can reduce the cost of grinding. In the formulas, one ceramic waste material can be adopted, while several ceramic materials can also be used. For example, a mixture of ceramic polishing waste materials and ground ceramic materials can be used. Additionally, it is understood that the waste materials produced during the manufacturing of lightweight ceramic heat insulation plates of this invention, for example, the waste produced by slicing, can also be used for making new ceramic heat insulation plates and recycling. The replacement quantity of the waste materials of the product of the present invention may be 5-10% with respect to other foamable ceramic waste, for example, the mentioned ceramic polishing waste and ground ceramic materials.

This invention fully utilizes the ceramic polishing waste materials and/or ground ceramic materials, significantly reduces the cost of raw materials for the products, changes the waste into resources, achieves the recycling of ceramic waste materials, and decreases the environmental pollution caused by ceramic waste materials. This invention also fully utilizes the self-foaming mechanism of foamable waste, and can avoid use of foaming agents or decrease the quantity of foaming agents used, thus decreasing the cost.

Besides the mentioned foamable ceramic waste, 0-20 wt % of sintering aids can be added into the raw material powders. Sintering aids can adopt waste glass powders, waste frit powders, and/or talcum, for example sodium calcium type waste glass powders, high calcium waste frit powders, black talcum, etc. One or more sintering aids can be used. Adding sintering aids such as waste glass powder, waste frit powder, and/or talcum into the formulas can decrease the sintering temperature of the products, save energy, and reduce consumption.

As stated above, the foamable ceramic waste used in this invention can utilize the self-foaming mechanism without foaming agents, for example, the ceramic polishing waste containing foamable compounds that decompose at high temperature can foam on their own, while for ground ceramic materials, for example, during the edging using silicon carbide grinding wheels, the silicon carbide particles brought in during the grinding process can function as the inner foaming agent. However, small quantities of foaming agent can be added for assistance, for example, when the grinding utilizes grinding wheels not made of silicon carbide, no more than 0.8 wt % of foaming agent can be added if using ground ceramic materials as the raw materials. For the foaming agent, one can utilize the commonly used silicon carbide, etc.

The raw material powders according to the mentioned formulas will yield foamble powders through the process of ball milling and powder-spraying, and the particle sizes of the foamable powders are 0.18-0.98 mm. Herein, the ball milling utilizes wet ball milling, and the ball milling medium can utilize medium aluminum balls, and the particle sizes of the powders after ball milling is controlled to be 250 mesh with sieve residues of 0.8-1.0%. The water content of the powders is controlled to be 5.0-6.0%.

100 parts of the mentioned foamable waste by weight and 3-15 parts of low melting point organics by weight are mixed and stirred to make mixture powders. The stirring can be performed with an agitator. The low melting point organics are organics which have low melting points, but are solid at room temperature, including, but not limited to, polyethylene wax, polypropylene wax, mineral wax, etc. It should be understood that, one low melting point organic can be used, but a mixture of any two low melting point organics can also be used. For low melting point organics one preferably utilizes powders, the particle sizes of which can be 0.15-0.25 mm. The low melting point organics may be preliminarily crushed and sieved in order to make the particle sizes meet the requirements.

By mixing 5%-15% granular powders with low melting points, like polyethylene wax, polypropylene wax, and mineral wax, with the raw powder materials, the wax organics can perform lubricating functions as shaping additives, which are advantageous for the shaping of raw brick; function as adhesives, which means, when the formed raw brick is dried at 130° C., the organics with low melting points melt into liquid state, permeate, and wrap around the powders, solidify again when cooling, form three dimensional networks, bond the powders into an ensemble, and improve the dry strength of the raw brick; and function as a pore-generating agent, so that the pores left after the organics are burned away decrease the bulk density of the products.

The mentioned mixture powder is put into a pressing machine, pressed, and shaped under ⅓-⅔ of the typical pressing forces for ceramics plates of the same specifications (for example 10-20 MPa). The thickness of a ceramic green body can be 12-20 mm. Different molds can be used during the pressing to make ceramic plates of different sizes, and the dimension of the molds used in this invention (long edges) can be 660-2060 mm.

In the method of this invention, the percentages of the foamable ceramic waste in the formulas range from 80-100%, the rest being waste glass powder, powders of waste frit, and talcum. The formulas do not include clay soil, thus decreasing the problems of insufficient oxidation and poor ventilation during firing. However, absence of clay soils is harmful to the pressing shaping by pressing machines, so organics with low melting points are utilized for low pressing force pressing. In one aspect, due to the large amount of impurity in the foaming waste, low-temperature fast firing needs quick ventilation, the pore proportion among powders increases, and density of the green body decreases as a result of the lower pressure, enabling the gas to have pathways for ventilation. In another aspect, loose pressure decreases the bulk density and decreases the partial deformation of the products due to the fast and intense swelling of the green body during the high temperature period.

The drying process can be carried out in a drying kiln, the drying temperature ranging from 120-150° C., the drying duration being 15-25 minutes, and the water content of the ceramic green body after drying being 0.2-0.5%.

The dried ceramic green body is fed into the roller kiln, fired once at high temperature, then followed by cooling so that low bulk density lightweight ceramic heat insulation plates can be made. The thickness of the ceramic heat insulation plates can be 16-22 mm, and after being cut into appropriate sizes they can by used as thermal-insulating materials for walls adhering to modern construction energy saving standards and as thermal-insulating and heat-retentive materials in other areas.

The process parameters for firing are: the ceramic green body is heated to 1100-1300° C. within 25-30 minutes, and kept at the temperature for 5-10 minutes.

According to GB/T 3810.3-2006 <Test methods of ceramic tiles-Part 3: Determination of water absorption, apparent porosity, apparent relative density, and bulk density> and GB/T 10294-2008 <Thermal insulation-Determination of steady-state thermal resistance and related properties-Guarded hot plate apparatus>, the properties of the lightweight ceramic heat insulation plates made from the present method are measured, and the measured bulk densities are 0.6-1.0 g/cm$^3$, thermal conductivities are 0.15-0.25 W/m·K. So, the lightweight ceramic heat insulation plates of this invention have low bulk densities, low thermal conductivities, have the characteristics of being environmental-friendly, fire-proof, sound-absorbent, thermally-insulative, moisture-resistant, impermeable, frost-resistant, fire-retardant, are types of environmentally-friendly materials, can be used as thermal-insulation materials for walls which adhere to energy-saving standards of modern constructions and as thermal-insulating and heat-retentive materials in other areas.

As compared with the prior art, this invention has the following advantages:

1) Most materials in the formulas are the waste materials produced in the manufacturing of ceramics, significantly decreasing the cost of the raw material for the products. Concurrently, the raw materials utilized are very fine, decreasing the cost of crushing and significantly shortening the time for ball-milling.

2) The present invention fully utilizes the self-foaming mechanism of foamable ceramic waste, can eliminate the need for using a foaming agent or decrease the quantity of the foaming agent, further reducing the cost.

3) The present invention replaces the clay soil with organics with low melting points, which are abundant in source, and function as shaping aids, adhesives, and pore-generating agents, saving the precious kaolin clay resources.

4) The present invention utilizes the loose-pressure method, which helps the oxidation and ventilation of the green body, further reduces the bulk density, and decreases the partial deformation caused by fast and intense swelling of the green body during the high temperature period. Additionally, loose-pressure powders can have very low water contents, saving drying time, and improving productivity.

5) Most of the contents in the formulas are ceramic clinkers that have been fired at high temperatures, ensuring that the products have superior performance after low-temperature fast firing.

Hereinafter, the present invention will be better described with the following representative examples. It is understood that the embodiments mentioned above and the following examples are only used to explain this invention and do not limit the scope of this invention, and any non-essential improvements and modifications made by a person skilled in the art based on this invention all fall into the protection scope of this invention. For example, the example 1 utilizes waste glass powders and black talcum as sintering aids, but it is understood that without using sintering aids, using 100 wt % foamable ceramic waste as the raw materials is effective. Also, the total amounts and percentages of waste glass powders, waste frit powders, and black talcum are not limited to those mentioned herein. Furthermore, it needs to be understood that the following formulas do not include foaming agents, but proper amounts of foaming agents can be used depending on the actual situation. The following examples adopt wax-based organics as the organics with low melting points, but it is understood that other proper organics with low melting points can be used. Meanwhile, the technology of the present invention is not limited to making ceramic plates, but also available for small sized ceramic tiles. Additionally, the specific processing parameters below such as temperature and time are only exemplary, and a person skilled in the art can choose proper values within the aforementioned ranges.

Example 1

As the formula of the ceramic heat insulation plate, 90% foamable ceramic waste (particle size 0.045-0.25 mm), 8% waste glass powders (particle size 0.10-0.25 mm), 2% black talcum (particle size 0.10-0.25 mm) are combined by weight, and made into a powder (particle size 0.18-0.98 mm) by ball-milling and powder-spraying. Then the powder is mixed uniformly with polyethylene wax which takes 5 wt % of the powders by agitator, fed into a pressing machine, placed into a mold with the dimensions of 1050 mm×2060 mm, pressed and shaped with the pressure (20 MPa) of ⅔ of normal pressure, dried in a drying kiln, fed into a firing roller kiln through a glazing line, and kept at 1121° C. for 6 minutes, to give low bulk density ceramic heat insulation plates with a bulk density of 0.95 g/cm$^3$, which have a thermal conductivity of 0.24 W/m·K.

Example 2

As the formula of the ceramic heat insulation plate, 95% foamable ceramic waste (particle size 0.045-0.25 mm), 5% black talcum (particle size 0.10-0.25 mm) are combined by weight, and made into a powder (particle size 0.18-0.98 mm) by ball-milling and powder-spraying. Then the powder is mixed uniformly with mineral wax which takes 14 wt % of the powder by agitator, fed into a pressing machine, placed into a mold with the dimension of 660 mm×1320 mm, pressed and shaped with the pressure (10 MPa) of ⅓ of normal pressure, dried in a drying kiln, fed into a firing roller kiln through a glazing line, and kept at 1163° C. for 9 minutes, to give low bulk density ceramic heat insulation plates with a bulk density of 0.65 g/cm$^3$, which has a thermal conductivity of 0.16 W/m·K.

Example 3

As the formula of the ceramic heat insulation plate, 85% foamable ceramic waste (particle size 0.045-0.25 mm), 7% waste frit powders (particle size 0.15-0.35 mm), 3% black talcum (particle size 0.10-0.25 mm) are combined by weight, and made into a powder (particle size 0.18-0.98 mm) by ball-milling and powder-spraying. Then the powder is mixed uniformly with polypropylene wax which takes 10 wt % of the powder by agitator, fed into a pressing machine, placed into a mold with the dimension of 880 mm×880 mm, pressed and shaped with the pressure (15 MPa) of ½ of normal pressure, dried in a drying kiln, fed into a firing roller kiln through glazing line, and kept at 1145° C. for 8 minutes, to give low bulk density ceramic heat insulation plates with a bulk density of 0.77 g/cm$^3$, which has a thermal conductivity of 0.19 W/m·K.

The industrial applicability: this invention has simple manufacturing procedures, is low cost, comprises resource-saving and environmentally-friendly construction materials, is appropriate for large-scale manufacturing, makes products which are lightweight energy-saving ceramic heat insulation plates having the functions of thermal-insulation, heat-insulation, sound-insulation, fire-resistance, and can be used in thermal-insulating materials for the walls following modern construction standards as well as heat-insulating heat-retention materials in other areas.

The invention claimed is:

1. A preparation method of low-temperature fast-fired lightweight ceramic heat insulation plates, comprising:
   performing ball milling and powder spraying on raw materials containing foamable ceramic waste to make foamable powders, the weight percentages of the foamable ceramic waste in the raw materials being 80-100 wt %;
   mixing 100 weight parts of the foamable powders with 3-15 weight parts of granular powders of organics with low melting points uniformly to obtain mixed powder materials, the particle sizes of the foamable powders being 0.18-0.98 mm, and the particle sizes of the organics with low melting points being 0.15-0.25 mm;
   pressing the mixed powder materials under 10-20 MPa to make a ceramic green body; and
   firing the ceramic green body at 1100-1170° C. to make the lightweight ceramic heat insulation plates, the procedure parameters for the firing being: the ceramic green body is heated to a temperature ranging from 1100° C. to 1170° C. within 20-35 minutes, and kept at the temperature for 5-10 minutes;
   the organics with low melting points including polyethylene wax and polypropylene wax.

2. The preparation method according to claim 1, wherein the foamable ceramic waste includes ceramic polishing materials and ground ceramic materials.

3. The preparation method according to claim 1, wherein the raw materials further include sintering aids of 0-20 wt % but not 0 wt %.

4. The preparation method according to claim 3, wherein the sintering aids include waste glass powders, waste frit powders and/or talcum.

5. The preparation method according to claim 1, wherein the raw materials further include foaming agents of 0-0.8 wt % but not 0 wt %.

6. The preparation method according to claim 1, wherein the weight percentages of the foamable ceramic waste in the raw materials are 90-100 wt %.

* * * * *